US012681697B2

(12) United States Patent
Mietke et al.

(10) Patent No.: US 12,681,697 B2
(45) Date of Patent: Jul. 14, 2026

(54) API SIMPLIFICATION PROCESS

(71) Applicant: SAP SE, Walldorf (DE)

(72) Inventors: Sebastian Mietke, Reilingen (DE);
David Bischof, Walldorf (DE)

(73) Assignee: SAP SE, Walldorf (DE)

( * ) Notice: Subject to any disclaimer, the term of this
patent is extended or adjusted under 35
U.S.C. 154(b) by 258 days.

(21) Appl. No.: 18/530,390

(22) Filed: Dec. 6, 2023

(65) Prior Publication Data

US 2025/0190179 A1 Jun. 12, 2025

(51) Int. Cl.
*G06F 8/30* (2018.01)

(52) U.S. Cl.
CPC ...................................... *G06F 8/30* (2013.01)

(58) Field of Classification Search
CPC ........................................................ G06F 8/30
See application file for complete search history.

(56) References Cited

U.S. PATENT DOCUMENTS

| | | | | |
|---|---|---|---|---|
| 6,487,709 B1 * | 11/2002 | Keller | ..................... | G06F 30/34 |
| | | | | 716/128 |
| 2002/0184401 A1 * | 12/2002 | Kadel, Jr. | ............. | G06F 16/289 |
| | | | | 719/315 |
| 2014/0208296 A1 * | 7/2014 | Dang | ...................... | G06F 8/751 |
| | | | | 717/123 |
| 2021/0044672 A1 * | 2/2021 | Gilling | .................. | H04L 67/535 |
| 2023/0385030 A1 * | 11/2023 | McVeigh | .................. | G06F 8/30 |

FOREIGN PATENT DOCUMENTS

| | | | | |
|---|---|---|---|---|
| KR | 101749210 B1 * | 6/2017 | ........... | G06F 21/566 |

OTHER PUBLICATIONS

Trenite, "Simplifying the Complex: Strategies to reduce existing
API Complexity using CPS techniques" (Year: 2023).*
Nguyen et al., "A Graph-based Approach to API Usage Adaptation"
(Year: 2010).*

* cited by examiner

*Primary Examiner* — Phillip H Nguyen
(74) *Attorney, Agent, or Firm* — Buckley, Maschoff &
Talwalkar LLC

(57) ABSTRACT

Provided are systems and methods that can generate a
simplified application programming interface for a custom
software system that includes a pre-built application pro-
gramming interface. In one example, a method may include
receiving source code of an application programming inter-
face (API) of a custom software system with built-in func-
tionality for accessing the custom software system, identi-
fying a subset of program components within the API which
are not active based on a configuration of the software
system, removing the subset of program components from
the API to generate a simplified API for the custom software
system, and transferring the simplified API to the storage.

20 Claims, 12 Drawing Sheets

Figure 2A:
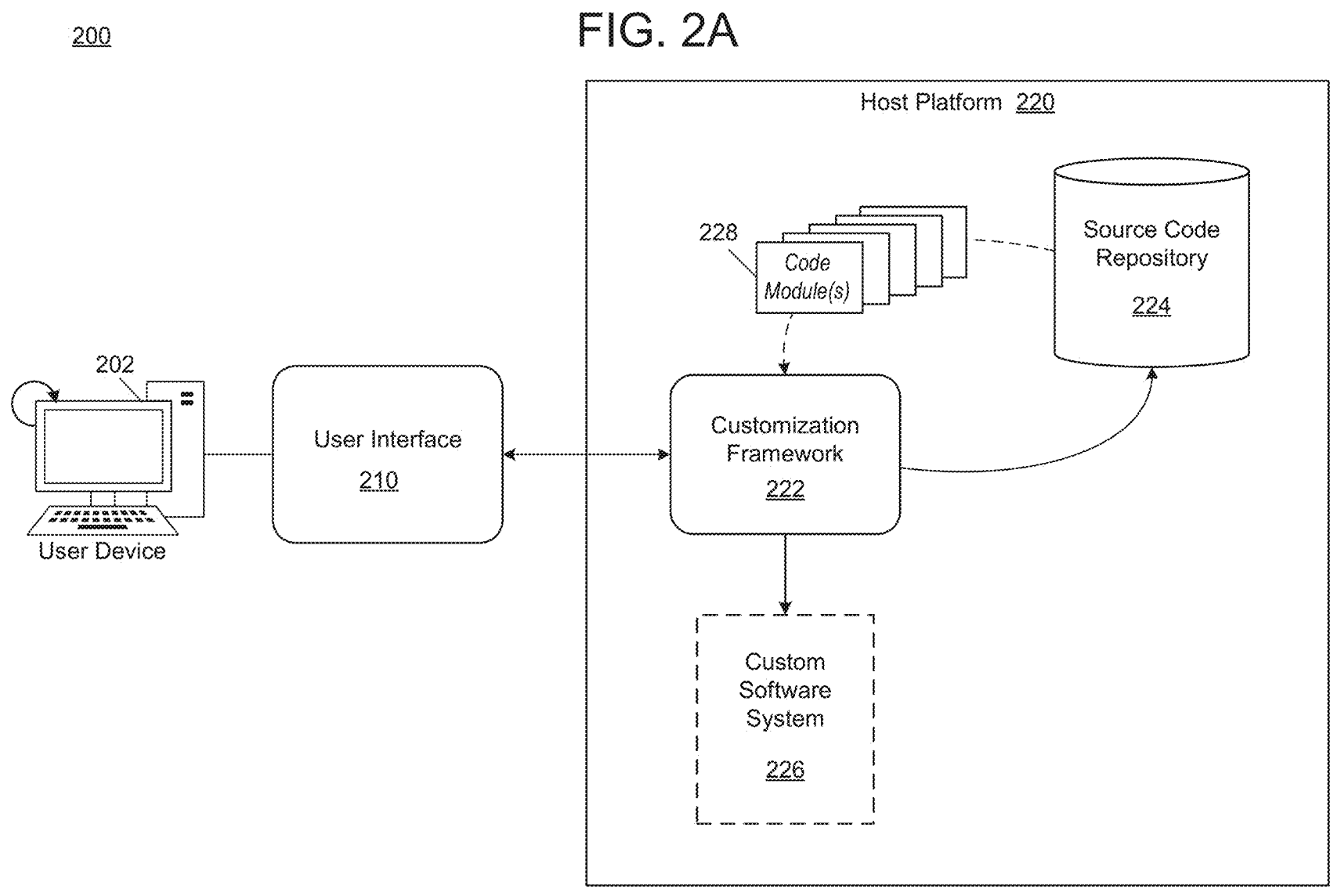

Host Platform 220

Source Code Repository 224

Code Module(s) 228

Customization Framework 222

Custom Software System 226

User Interface 210

User Device 202

Figure 3A:
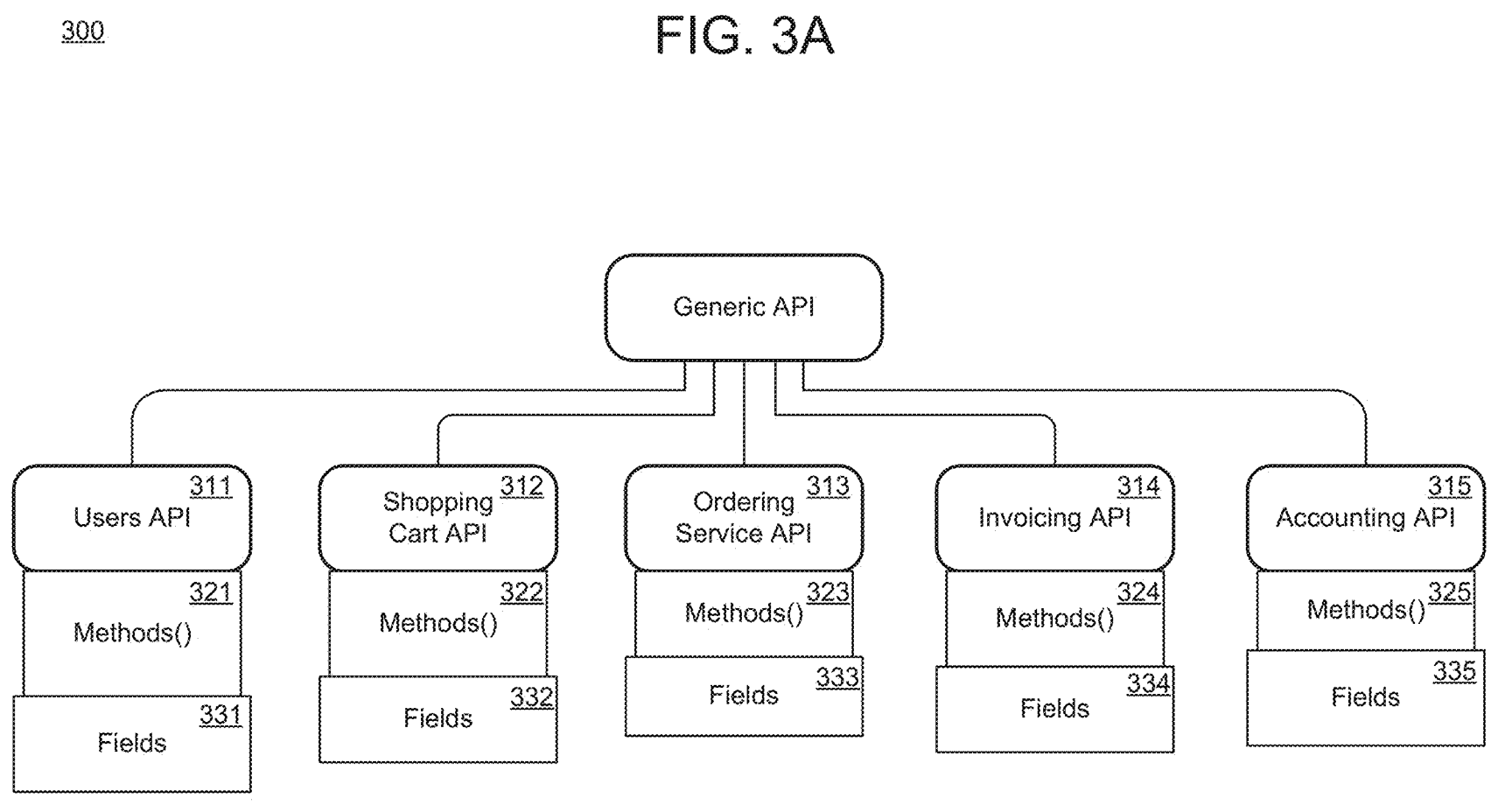

Generic API

Users API
311
Methods()
321
Fields
331

Shopping
Cart API
312
Methods()
322
Fields
332

Ordering
Service API
313
Methods()
323
Fields
333

Invoicing API
314
Methods()
324
Fields
334

Accounting API
315
Methods()
325
Fields
335

Figure 3C:
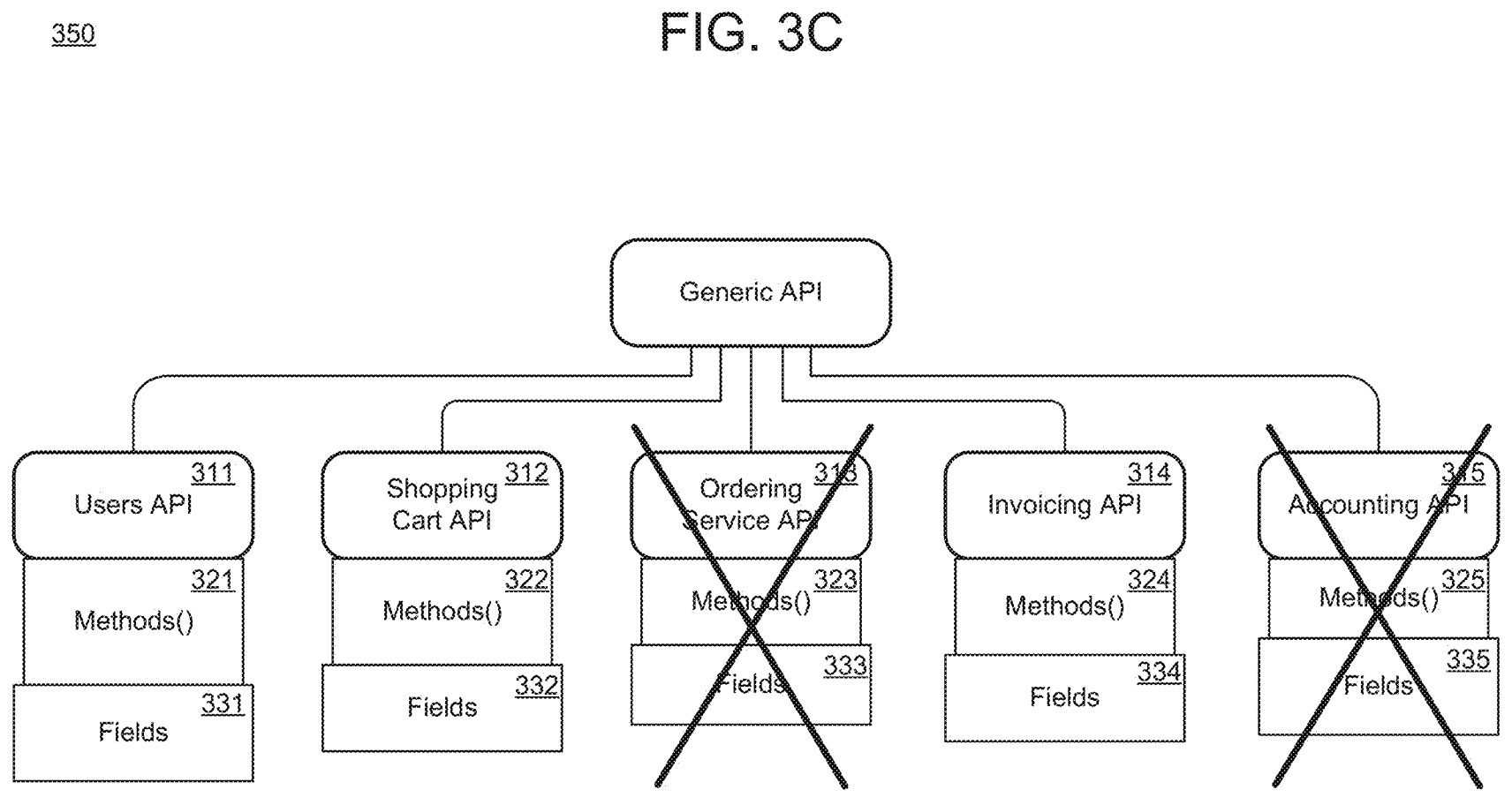

Generic API

Users API 311
Methods() 321
Fields 331

Shopping Cart API 312
Methods() 322
Fields 332

Ordering Service API 313
Methods() 323
Fields 333

Invoicing API 314
Methods() 324
Fields 334

Accounting API 315
Methods() 325
Fields 335

Figure 4A:
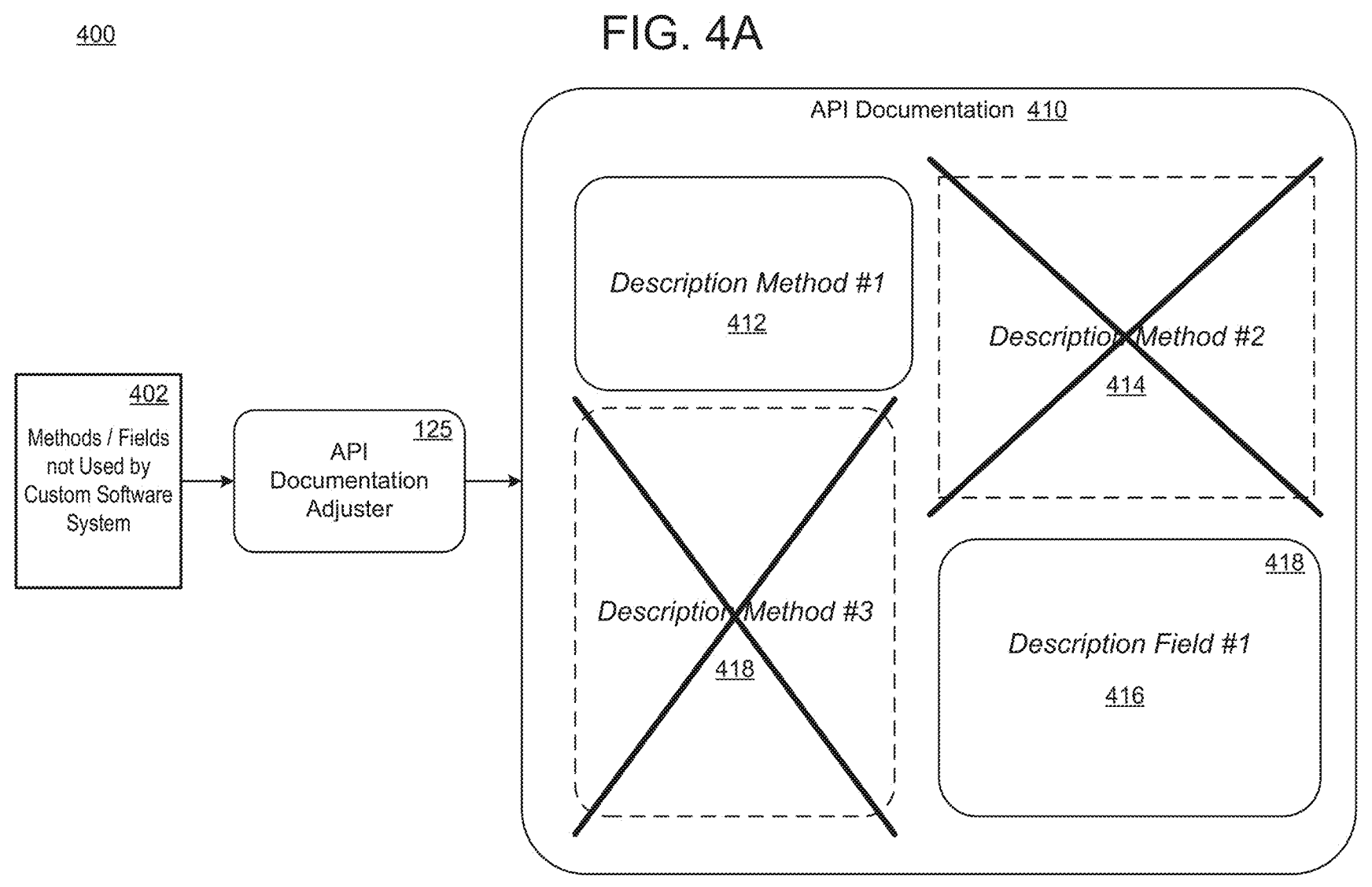

API Documentation 410

Description Method #1
412

Description Method #2
414

Description Method #3
418

Description Field #1
416

418

125

API
Documentation
Adjuster

402

Methods / Fields
not Used by
Custom Software
System

<u>500</u>         # FIG. 5
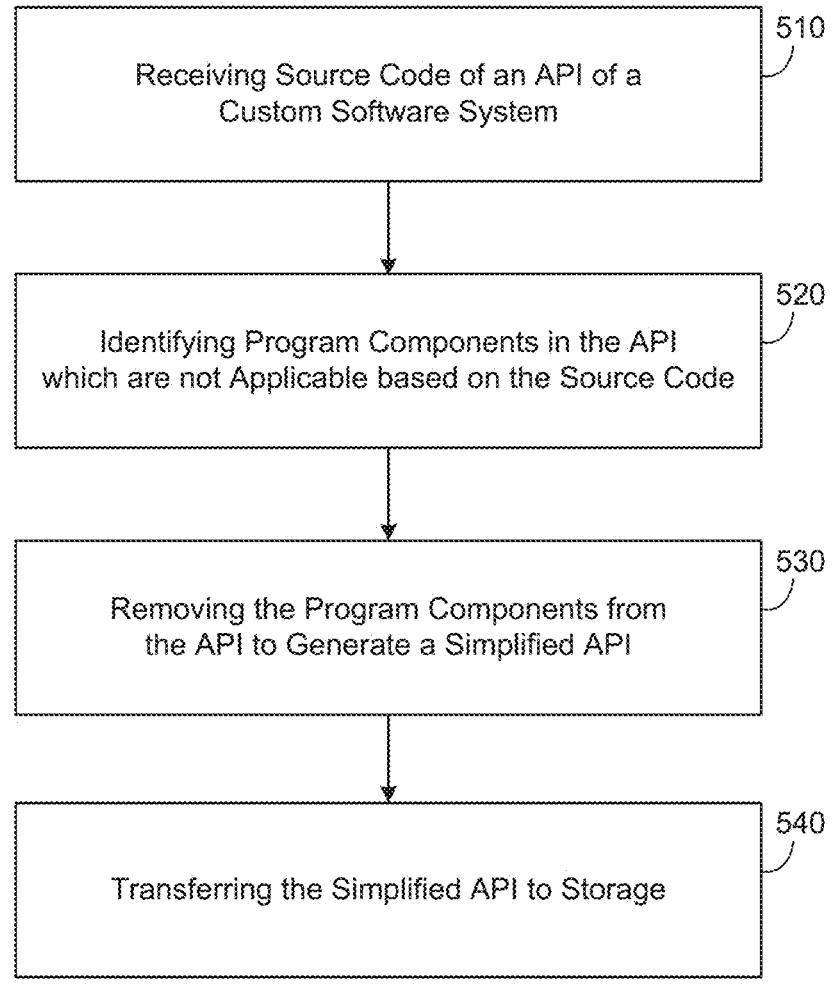
510
Receiving Source Code of an API of a
Custom Software System
520
Identifying Program Components in the API
which are not Applicable based on the Source Code
530
Removing the Program Components from
the API to Generate a Simplified API
540
Transferring the Simplified API to Storage

API SIMPLIFICATION PROCESS

BACKGROUND

Software systems often expose functionality, data, and other transparencies through an application programming interface (API). The API may be part of a software system and may include different functions, types of data, operations, and the like, which can be performed by the software system through the API. Furthermore, a software developer may enhance the software system so that it can communicate with the API and interact with the data, the operations, and the functionality through the API. As an example, an API may be developed based on one or more API classes of programming code, which are contained in the software system. The API class may include multiple methods therein that can be used by other software/application components (short: component) in the same software system. Each of these APIs may include one or more methods, to expose the functionality of one component to the others.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIGS. 2A-2B are diagrams illustrating a process of developing a custom-developed software system in accordance with example embodiments.

FIGS. 3A-3D are diagrams illustrating a process of simplifying an API through source code analysis and removal in accordance with example embodiments.

FIGS. 4A and 4B are diagrams illustrating a process of adjusting documentation of an application programming interface in accordance with example embodiments.

FIG. 5 is a diagram illustrating a method of simplifying an application programming interface in accordance with an example embodiment.

DETAILED DESCRIPTION

Figure 1A:
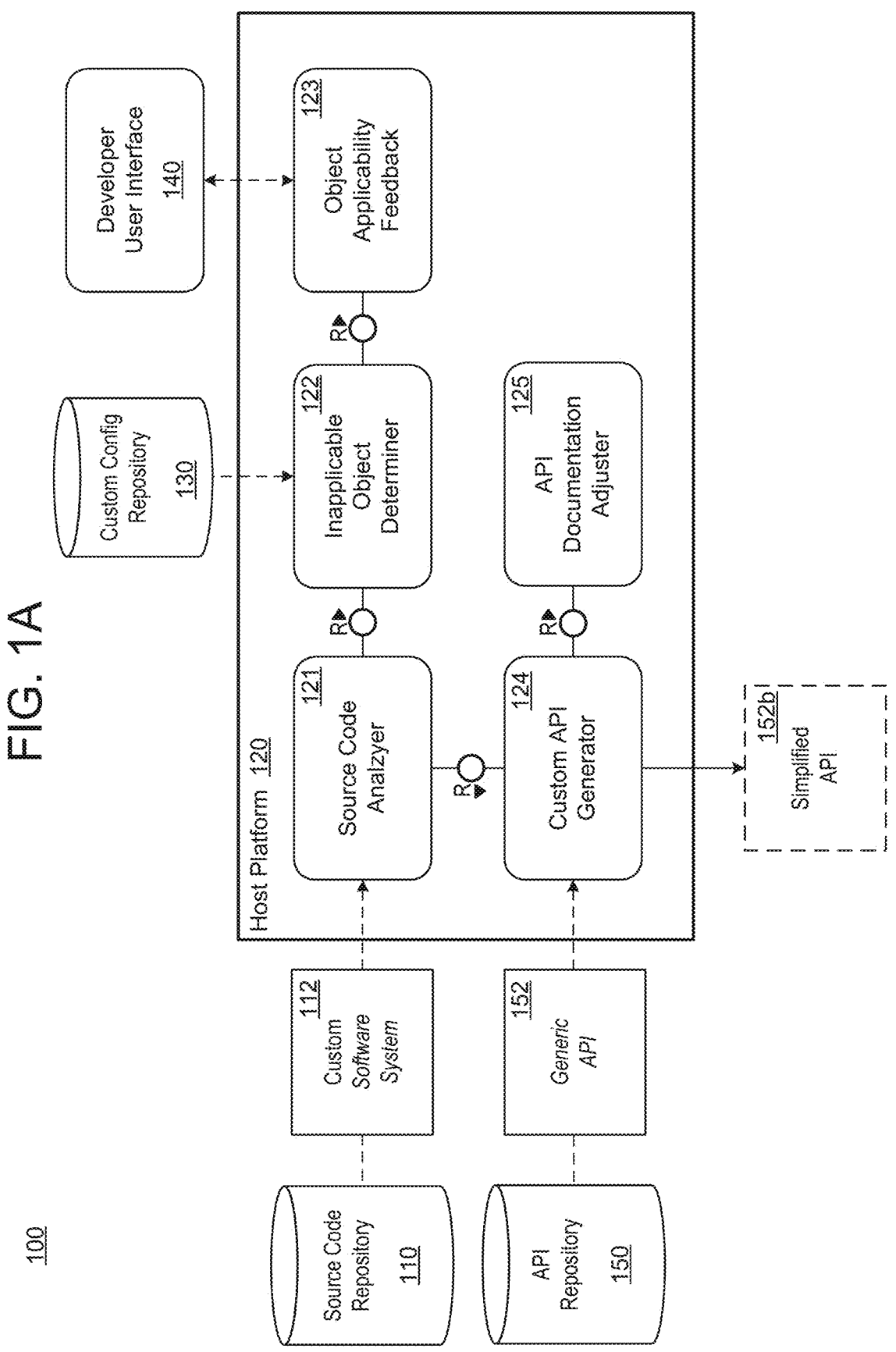
FIG. 1A is a diagram illustrating a computing system for simplifying an application programming interface in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation.

However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

An application programming interface (API) is a software intermediary that enables software programs to communicate with one another. For example, an API that is part of a first software system may be used by other software systems to access functionality, data, and/or the like, provided by the first software system. Furthermore, an API class is a technical development object, which is contained in a component of the software system, to expose its functionality to other components of the same software system. Components might contain more than one APIs. The APIs are provided by the software manufacturer, as parts of the software system.

An integrated development environment or other service provider may offer pre-built functionality (e.g., code modules) that users can select from through a framework to build a custom-version of a software system such as a software application. The pre-built functionality may include a pre-built and generic API with multiple different API services therein. When a developer adds the pre-built API class to a custom developed software, the pre-built API class provides the developer with functions, data types, and the like, which the software system can use to expose its own functionality and to connect to other software systems. However, the pre-built API class may include a large amount of methods necessary for all possible API services available in the API, whereas a user's custom build may only use a subset of the API services.

Typically, a user must read the documentation provided by a manufacturer of the API to learn about the methods therein. After the reading the documentation, the user can decide, which methods are actually needed. However, this process is very time-consuming for a developer as it requires documents to be read, comprehended, and used to edit the underlying source code of the API.

Often, these API classes are used in custom implementations in the software system. Each customer may have their own custom logic, custom processes and the like. As an example, a posting API might be provided by the software manufacturer. This API evaluates the provided data. It derives missing information (e.g., from the customizing of the software system), performs validations and writes the data to the database, if the validations were successful. This API can be used by the customer in his custom logic, to create posting documents easily. The customer does not have to implement the derivations, validations, database access, etc., since this functionality is already part of the API. Because the API class might be used by all customers, it must support all possible configurations of the software system. Therefore, the API classes are often quite complex. Thus, an API usually contains multiple methods with many parameters. Usually, not all functionality of the API is used by each customer. Therefore, not all methods/parameters for methods are required for each customer.

As another example, the developer may be working with a private sector customer. Therefore, all public sector specific methods and public sector specific parameters of the methods (methods and fields of the API) are not relevant for the developer. Here, the API might provide functionality, which might or might not be relevant for the specific customer. If functionality is relevant depends on licensing, switching on/off specific features of the customer system, the customizing of business processes in the customer system, and the like.

According to various embodiments, an API simplification process is provided. For example, the API simplification process may analyze the source code of an API that is already included within a custom software system and identify functionality within the API that is not needed by the customized software system. Here, the API simplification process can remove the code components from the API within the custom software system which will never be used based on the current configuration within the custom software system to generate a simplified API. The API simplification process can identify which API services are needed from the pre-built API based on configurations within the underlying source code of the API.

In the examples above, some of the methods from a generic API are no longer needed in the developer's custom software system. Traditionally, in such a scenario, the developer would need to investigate (e.g., reading the API documentation) to identify what components can be neglected for the planned custom implementation. In contrast, through the API simplification process described herein, the system can automatically determine (e.g. from the configuration of the custom software system) the parts of the API that can be hidden. The system can hide fields and methods of the generic API (and the corresponding documentation), depending on the overall configuration of the software system. With this, the developer faces a slim API. The developer just has to get familiar with the functionality of the API, which is relevant for the custom implementation within the custom software system.

For example, certain features of the custom software system might be inactive, so one or more methods of the API are not relevant within the custom software system. These methods are hidden in the custom version of the API and in the corresponding documentation. This means, parts of the API are actively deactivated in the custom version of the API. Thus, the developer no longer needs to read the complete API documentation to comprehend all the components of the API but only the API documentation for the relevant components of the API. The system described herein automatically deactivates functionality of the API within the generic API using conditional logic and simplifies methods. However, a specific customer may only use a few of them, due to the custom configuration of the software system. The simplification process described herein can analyze the custom configuration of the custom software system and remove unnecessary functionality from the generic API that will not be used due to the custom configuration.

According to various embodiments, the system described herein may retrieve source code of the generic API and analyze conditional statements within the source code of the generic API to identify which API functionality is needed by the current configuration of the custom software system and which functionality is not needed due to the current configuration of the custom-developed software system. For example, the system may analyze conditional logic of an API class, and identify one or more methods, which are not needed by the custom software system, due to the configuration of the software system. In some embodiments, the system considers switching mechanisms (e.g. checking which features of the software system are active/inactive), and the like but also the customization of business processes, etc.

In some embodiments, a developer on customer side provides the name of the generic API which provides functionality to be used in the planned custom implementation. The system identifies which functionality is not needed, due to the configuration within the source code of the generic API, and creates a customer specific wrapper around the generic API. Alternatively, the system may not create a wrapper but may instead create a simplified copy of the generic API. The simplification process may remove (e.g., hide, deactivate, etc.) all unnecessary methods and parameters from the API class. Thus, the interface of the API gets simplified. The developer on customer side can use the simplified API instead of the generic API. The developer is not distracted by unnecessary methods and the like, no investigation of unnecessary functionality is required. In addition, the documentation associated with the generic API may also be simplified.

Below is an example of a snippet of code from a generic API which includes conditional logic that can be analyzed by the process described herein and used to identify whether or not an API service is needed.

| Source Code A |
| --- |
| IF CL__FEATURE__SERVICE->IS__ACTIVE('BUSINESS__FEATURE__A') EQ TRUE.<br>    CL__POSTING__SERVICE->POST(DOC__DATA)<br>ENDIF. | the generic API based on the conditional statements within the conditional logic. The result is a "customer-specific" version of the generic API provided by the software manufacturer, will be generated. This simplified custom version can then be used instead of the generic API. Therefore, the customer faces a reduced complexity during the custom implementation.

The generic API described herein may be part of a pre-built software system. Here, the generic API may provide a generic but complex set of API services to the software system. Developers on a customer side may use the pre-built software system and build customer specific applications, classes, services, etc. The custom design may include the ability to communicate with the generic API. In some embodiments, the API may include a great deal of In the above example, the "IF" condition in Source Code A of the generic API checks the activation status of a business feature (Business Feature A). If the feature is active, the posting API service will be called. In this example, the feature is "off", so there is no need to have this branch available for this specific customer in the generic API. Considering this branch to be the only one in a method of the generic API, the overall method can be removed from the generic API for the customer resulting in a customer-specific API with unnecessary functionality removed. Unnecessary parameters can be removed as well. Therefore, the customer specific API (simplified wrapper or copy) may not contain this method.

Figure 1B:
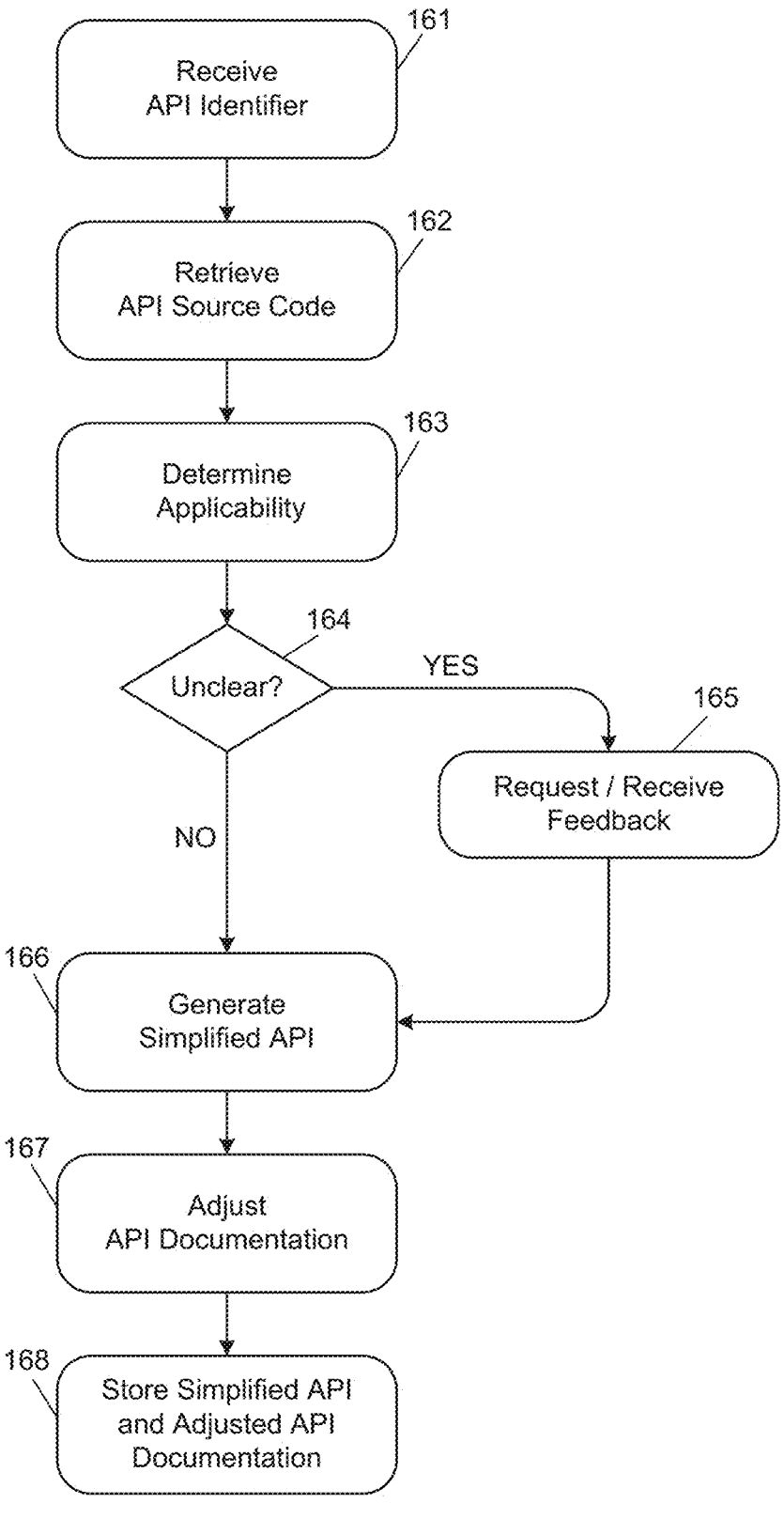
FIG. 1B is a diagram illustrating a process performed by the computing system shown in FIG. 1A in accordance with an example embodiment.

FIG. 1A illustrates a system 100 for simplifying an application programming interface in accordance with an example embodiment. FIG. 1B illustrates an API simplification process 160 performed by the system 100 shown in the example of FIG. 1A in accordance with an example embodiment. Referring to FIG. 1A, the system 100 includes a host platform 120 such as a cloud platform, a web server, a database, a virtual machine, a combination of systems, and the like. The host platform 120 includes components for simplifying an application programming interface (API). For example, a source code analyzer 121 may retrieve source code 112 of a generic API that is included in the custom software system. Here, the source code 112 may be pulled from a repository 110 in response to receiving an identifier of the generic API from a user interface of the developer device (not shown). As another example, the source code 112 may be uploaded from the developer device.

The source code analyzer 121 may analyze lines of code within the source code 112 of the generic API within the custom software system to determine which functionality of the generic API is active and which functionality is inactive. As an example, the source code analyzer 121 may identify conditional statements within the source code 112 which identify whether or not a particular feature is active within the custom software system.

The analyzed source code from the developer may be provided by the source code analyzer 121 to an inapplicable object determiner 122 which can identify parts of a generic API 152 used by the custom software system which are inapplicable due to the configuration of the custom software system. Here, the generic API 152 (e.g., source code, etc.) may be retrieved from a repository 150. In this example, the inapplicable object determiner 122 may identify portions of source code of the generic API 152 that can be deactivated within the generic API 152 due to the inactive and/or active features of the custom software system that are identified within the source code 112 by the source code analyzer 121. As an example, the inapplicable object determiner 122 may identify a method, a data field, a function, and/or the like, included in the source code of the generic API 152, which is not applicable to the custom software system and which can be deactivated from the generic API 152 to generate a simplified API 152*b*. For example, a wrapper can be added to the generic API 152 to create the simplified API 152*b* that removes functionality from the generic API 152.

If the inapplicable object determiner 122 cannot determine the applicability of a part or multiple parts of functionality within the generic API 152, the host platform 120 can display a user interface 140 on a user device of the developer with a question that is posed to the developer. An example of a question provided to the developer might be: "Is the planned custom development also relevant for 'Accounting Service (client a1c2)?". Depending on the feedback from the developer, the applicability of the Accounting Service may be determined to be not active. In this example, it should not be applicable. Such questions may be generated and displayed on the user interface 140 by the object applicability feedback (OAF) component 123. The OAF component 123 receives the feedback, which is passed to the inapplicable object determiner 122. The feedback may identify which parts of the API which can be removed or which parts are not active.

In addition to identifying the applicability of parts of functionality from the user interface feedback, the inapplicable object determiner 122 may automatically identify the applicability of the different parts of functionality in a dynamic manner from the source code of the generic API based on custom configurations of "if-then" statements within the source code of the generic API which are identified by the inapplicable object determiner 122. The if-then statements may identify conditions that make parts of the functionality of the API inactive. The configurations may be identified from a repository 130.

The custom API generator 124 receives the list of parts of the generic API 152 which can be removed and simplifies the generic API 152 to generate the simplified API 152*b*. As an example, the custom API generator 124 may generate a customer-specific wrapper API consuming the generic API 152 to generate the simplified API 152*b*. As another example, a new API could be generated for the simplified API 152*b* and the new API could be used to replace the generic API 152 within the custom software system.

In some embodiments, different kinds of configuration settings might be included in the source code 112 of the generic API. Furthermore, client dependent configurations might be considered, as described. This can be beneficial when the specific API is only used for a custom development within a particular product, and which is only active in a dedicated client. (The API will be technically available in all clients, since the code is assumed to be cross-client. Nevertheless, it is specifically cut for the usage in a particular client.)

Furthermore, API documentation of the custom software system may be adjusted by the API documentation adjuster 125. For example, a documentation object can be retrieved from the generic API object and modified to remove parts of the documentation that refer to components of the API that have been removed. Here, the parts can be turned "on" and "off" within the documentation depending on whether the corresponding functionality in the simplified API 152*b* is "active" or "inactive".

For example, the API documentation for the generic API 152 may contain multiple sections, which might apply to one or more fields/actions of the API and vice versa, leading to a nom relation between field/action and section of the documentation. The customization by the developer may cause fields and/or actions to no longer be needed in the API. The documentation associated with these fields and/or actions can be deleted from the documentation. Furthermore, the simplified API 152*b* and the adjusted documentation may be transmitted to the developer, stored in repository, and kept secure from other users and systems.

Referring now to FIG. 1B, the system described in FIG. 1A may perform an API simplification process. For example, in 161, the system may receive an identifier of a generic API (as part of the custom software system) from a user, and in 162, the system may retrieve source code of the generic API. The source code may be stored in a repository or the like. In 163, the system may determine the applicability of the functionality within the API based on custom configurations of the custom software system. In this example, the system identifies parts of the functionality that are active within the custom software system and a subset of features that are inactive based on configurations of the software system. At 164, the system determines if the applicability of any part of the functionality is unclear. If the applicability is unclear, in 165, the system displays a user interface on a device of a developer or the like and receives feedback about the applicability in that manner.

Once the applicability is clarified, in 166, the system may generate a simplified API by generating a wrapper around components of the API source code that are only needed for executing the active features within the generic API thereby removing the inactive features from the generic API. As another example, if the system determines that the applicability of the part of functionality is clear in 164, the system may generate the simplified API in 166 without displaying the user interface in 165. Furthermore, in 167, the system may adjust documentation associated with the API.

For example, the system may remove display components such as pages, modules, cards, and the like, from a digital document such as a PDF, an XML document, a JSON document, or the like. In 168, the system may store the simplified API source code and the simplified API documentation together in storage. As an example, both of the simplified API source code and the simplified API documentation may have a common label assigned to them or a mapping that is used to identify that the API documentation and the source code are related to one another.

Figure 2B:
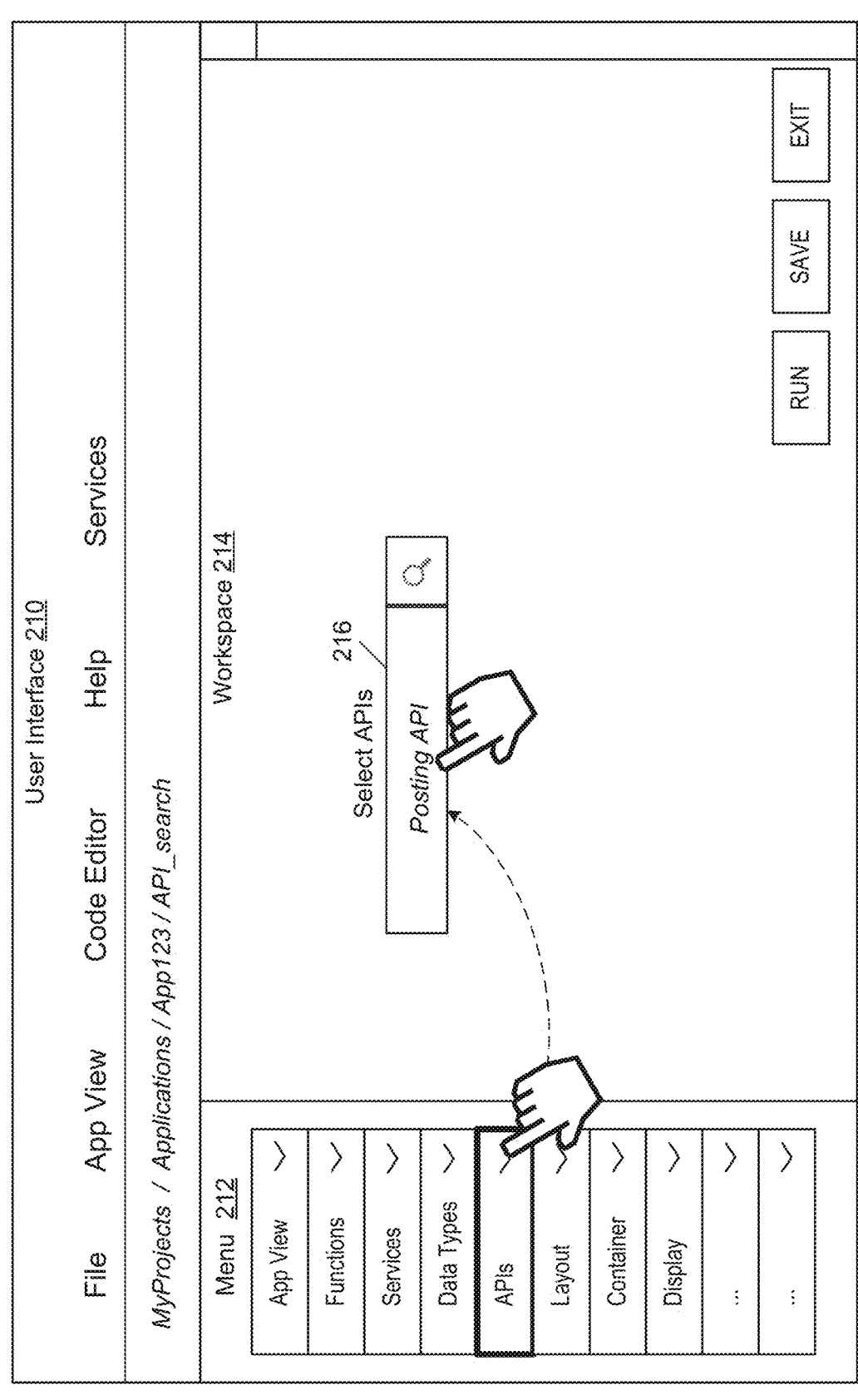

FIGS. 2A-2B illustrate a process of customizing a custom software system in accordance with example embodiments. For example, FIG. 2A illustrates a process 200 of a custom software system 226 being customized via a customization framework 222. In this example, the customization framework 222 is hosted by a host platform 220 such as a cloud platform, a web server, and the like. A user may access the customization framework 222 via a user device 202. For example, the user device 202 may visit a web page of a progressive web application (PWA), a mobile application, a website, or the like, via a user interface 210 and access the customization framework 222 over a network.

An example of the user interface 210 is shown in FIG. 2B. Here, the user interface 210 includes a menu 212 with commands, a workspace 214 where a user may search for code components to add to the custom implementation within the custom software system 226, view underlying source code, and the like. The menu 212 may include commands for adding, deleting, modifying, etc., the components of an API including the methods, the parameters, the data types, and the like. Here, in FIG. 2B, the user has selected an API via a field 216 of the user interface.

Returning again now to FIG. 2A, the customization framework 222 may provide the user device 202 with access to a pre-built software system which includes different software components that a user can add to the custom software system 226. The pre-built software system may include a large application where a developer can choose from different packages, classes, methods, etc. in that order. For example, the user can select code pieces from the pre-built software system to be used in custom implementations in the custom software system 226. Meanwhile, the customization framework 222 is where the developer selects the functions and extensions that they want to use and activate them within the custom software system 226. Everything is then delivered to the user. The user can go through and check the functionality they want to use including business functions such as shopping carts, etc. Once the user has activated the features, the customization framework 222 can perform the simplification for a given generic API.

For example, a customer can activate generic features within their custom software system and also customize features within their custom software system. The configuration that is generated is stored by the customization framework 222 (e.g., the host platform, etc.) and used to identify which parts of the API can be simplified.

The customizing activities may include customizing document types, logic, functions, rules, settings, etc. The configuration process includes activating features, customizing functions such as number ranges, etc. Beside this, the software system provides APIs, which can be used in custom implementations. These APIs are provided to realize custom logic, which is not covered by customized standard soft-ware. The custom logic may include custom processes, objects, etc. To make this easier for the developer, functionality can be exposed through APIs within a generic API, which provides sufficient flexibility. The generic API may be exposed to the developer through an API class. For example, a posting API may perform some basic derivation where the data is derived and then the data is written to a database. With basic information the overall document is created. Here, a developer can use logic exposed by the API by simply calling an API. The API is provided by the software manufacturer to make things easier for the customer. It could be a different technical object besides a software class.

The simplification process may identify conditional statements (methods) in the source code of the API that cannot be fulfilled during execution. For example, because the business function is off or a certain customizing has not been performed, the method may be determined as not being able to be fulfilled during execution and can be removed from the custom version of the API. The removal may happen many times—if the overall method is skipped other dependent methods may also be omitted as well. Thus, the source code itself gets reduced. For example, a number of methods, a number of fields (i.e., the number of parameters used by the methods, etc.), or the like, may be reduced within the custom version of the API.

Furthermore, the developer/customer may also create custom implementations for the logic of the custom software system 226 can't be covered by the customized standard software. These custom implementations may use the APIs that are simplified by the process described herein. That is, software programs, systems, etc., that communicate with the custom software system 226 may use the simplified API created by the example embodiments.

FIGS. 3A-3D are diagrams illustrating a process of simplifying an API through source code analysis and removal in accordance with example embodiments. For example, FIG. 3A illustrates an example of the logical components included in a generic API 300. In this example, the generic API 300 includes five software API services including a user API service 311, a shopping cart API service 312, an ordering API service 313, an invoicing API service 314, and an accounting API service 315. Each of the API services also include methods and data fields (e.g., variables, table values, column values, etc.) that are consumed by the methods.

For example, the user API service 311 includes a set of methods 321 and a set of fields 331 which may be public attributes of a corresponding software class or parameters for methods within the software class. In addition, the shopping cart API service 312 includes a set of methods 322 and a set of fields 332 which may be public attributes of a corresponding software class or parameters for methods within the software class. In addition, the ordering API service 313 includes a set of methods 323 and a set of fields 333 which may be public attributes of a corresponding software class or parameters for methods within the software class. In addition, the invoicing API service 314 includes a set of methods 324 and a set of fields 334 which may be public attributes of a corresponding software class or parameters for methods within the software class. In addition, the accounting API service 315 which may be public attributes of a corresponding software class or parameters for methods within the software class.

The generic API 300 may include modular components that can be removed and/or added to the underlying source code for executing the services and methods. For example, software classes, software methods, data fields, functions, and the like, may be modularly designed within the source code and removed from the generic API to create a simplified API.

Figure 3B:
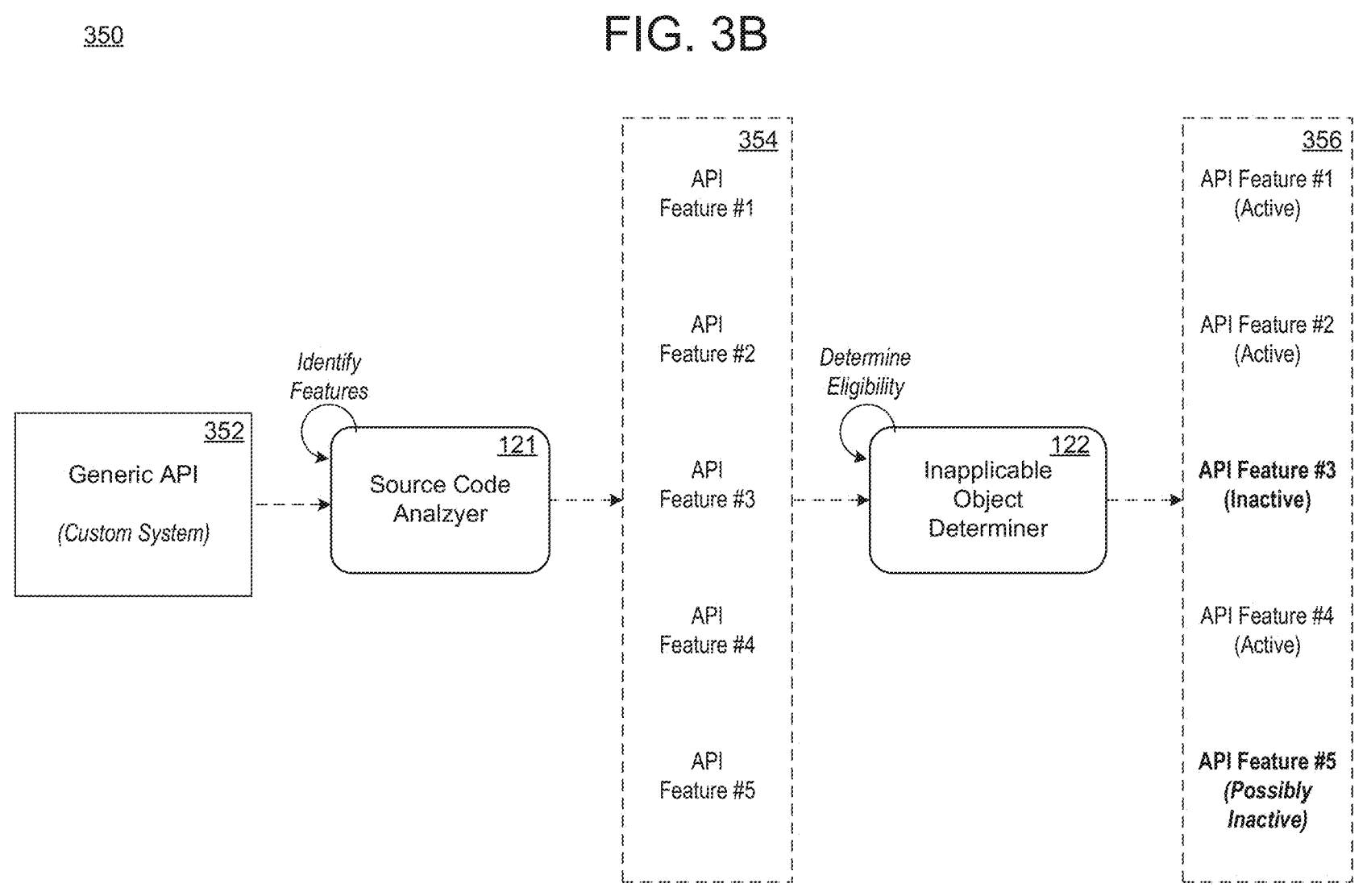

FIG. 3B illustrates a process 350 of identifying inactive parts of functionality within an application programming interface in accordance with example embodiments. Referring to FIG. 3B, the system may receive source code 352 of a generic API that is part of a custom software system. The generic API may include source code that is provided to an administrator of the host platform. The source code of the generic API may include conditional statements therein that indicate whether parts of the functionality of the API are applicable or inapplicable, depending on the configuration of the software system. In this example, the source code analyzer 121 may analyze lines of code from the source code 352 and search for statements that identify the applicability of various parts of functionality within the source code 352.

As an example, a part of functionality within the generic API may include a conditional statement (e.g., an "if-then" statement, etc.) which can be analyzed by the source code analyzer 121 to determine whether that part is applicable. In the example of FIG. 3A, there are five API services corresponding to the five components of the generic API 300 (i.e., the user API service 311, the shopping cart API service 312, the ordering API service 313, the invoicing API service 314, and the accounting API service 315). According to various embodiments, the different components in the generic API 300 (i.e., the user API service 311, the shopping cart API service 312, the ordering API service 313, the invoicing API service 314, and the accounting API service 315) can be activated (applicable) or deactivated (inapplicable) based on conditional statements within the source code 352. In this example, each of the five components of the API corresponds to a feature of the software system, for the sake of simplicity.

Here, the source code analyzer 121 may identify conditional statements in the source code 352 of the generic API to identify five conditional parts of functionality 354 within the generic API 300. Here, the conditional statements may indicate whether or not a respective part of functionality is active within the custom software system. In this example, the source code analyzer 121 may pass the five parts of functionality 354 to the inapplicable object determiner 122. In this example, the inapplicable object determiner 122 may determine the activation status of the different features of the custom software system and the applicability of the parts of functionality within the API based on the conditional statements. For example, the inapplicable object determiner 122 may determine that the user API service 311, the shopping cart API service 312, and the invoicing API service 314 should be kept within the generic API 300 because the corresponding features of the software system are active. Meanwhile, the inapplicable object determiner 122 may determine that the ordering API service 313 is not needed from the generic API 300 and the accounting API service 315 is only partially activate in certain circumstances. Checking the activation state of a feature of a software system is just an example. The overall configuration is checked in general, to determining the applicability of a part of functionality of the API (part of source code of the API).

FIG. 3C illustrates a process 350 of removing parts of the generic API 300 based on the applicability of the parts of the functionality of the API identified in FIG. 3B. In this example, the custom API generator 124 may generate a customer-specific wrapper API consuming the generic API 300 that removes the ordering API service 313, the set of methods 323 and the set of fields 333 of the ordering API service 313 since it is not needed by the custom software system.

Furthermore, the inapplicable object determiner 122 may determine whether the partial availability of the accounting API service 315 applies to the current system. For example, if a part of functionality is dependent on a different "if-then" condition, the inapplicable object determiner 122 may analyze other statements within the source code to determine the applicability of other parts of the source code. As another example, the host platform may display a user interface on a developer system that enables the developer to provide feedback such as via the user interface 140 shown in FIG. 1A. As such, more content can be removed from the custom version of the API based on the feedback from the developer.

In this example, the inapplicable object determiner 122 determines that the accounting API service 315 is not applicable based on another portion of the source code of the generic API, and it removes the accounting API service 315, the set of methods 325 and the set of fields 335 from the generic API 300. By removing the ordering API service 313, the accounting API service 315, and the methods and fields of those services from the source code of the generic API, the source code is more lightweight and is easier to be used in custom implementations.

Figure 3D:
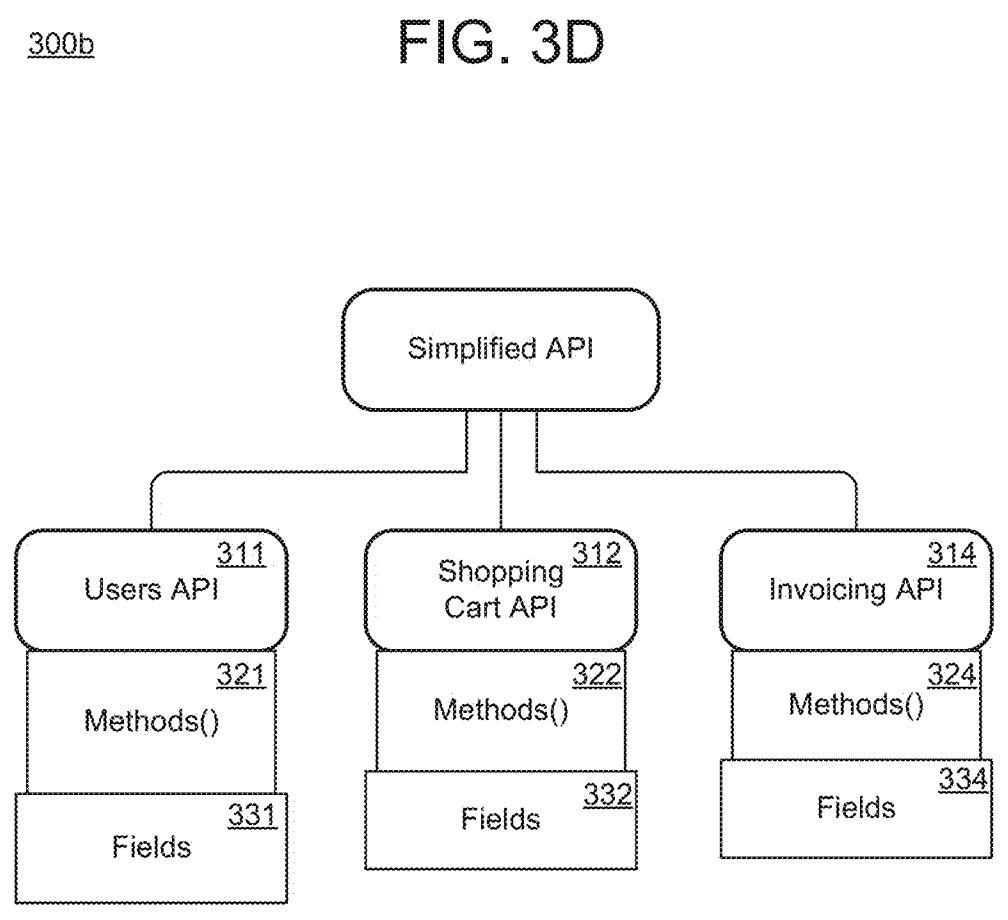

FIG. 3D illustrates a simplified API 300b that is generated by removing the source code components of the ordering API service 313, the accounting API service 315, and the corresponding methods, fields, and data types thereof from the generic API 300. The simplified API 300b that results from the process requires less storage space because it is smaller in size. It also requires less processor bandwidth as there are less statements to execute within the source code of the API.

Figure 4B:
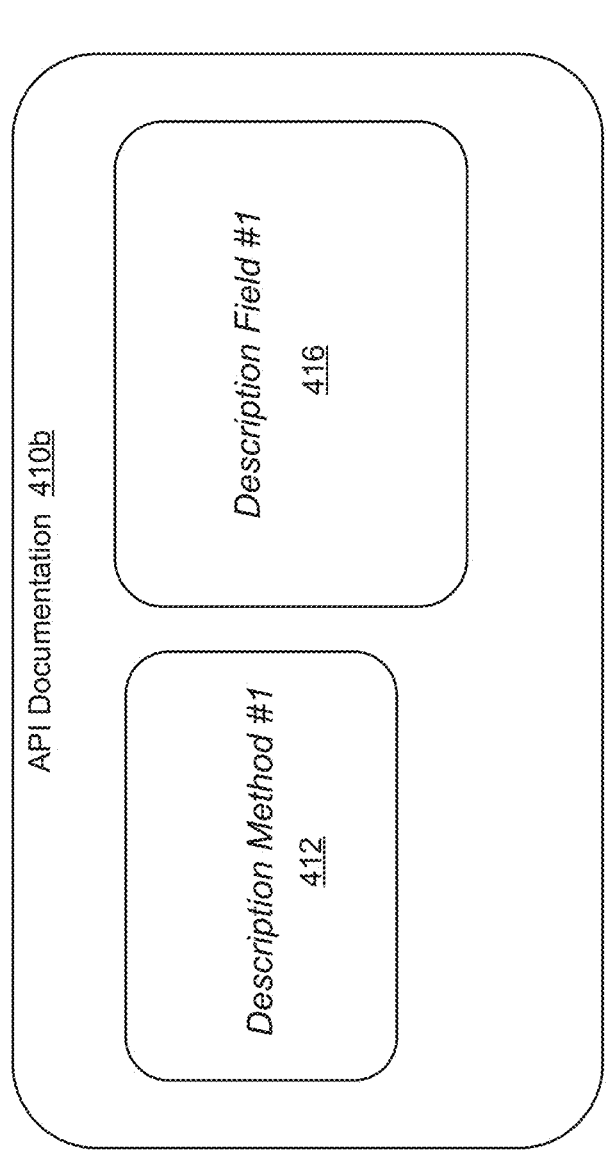

FIGS. 4A and 4B illustrate a process of adjusting documentation of an application programming interface in accordance with an example embodiment. For example, FIG. 4A illustrates a process 400 of removing documentation parts from API documentation 410. In this example, the API documentation 410 may be for a generic API and may contain many different parts that apply to many different services, fields, or methods of the API. Here, the system may receive a list of methods and fields of the API which are not going to be used by the custom software system from the inapplicable object determiner 122, and adjust documentation of the API to remove description associated with the list of methods and fields of the API which are not going to be used by the custom software system.

In this example, the API documentation 410 includes a description 412 corresponding to a method, a description 414 corresponding to a second method, a description 416 corresponding to a third method, and a description 418 corresponding to a data field. Each of the descriptions may include user interface content that is capable of being removed dynamically from the API documentation 410 by the system. Here, the API documentation adjuster 125 may receive identifiers 402 of the methods and the fields of the generic API which are not used by the custom software system and remove content from the API documentation based thereon.

In some embodiments, the sections of the document that describes the generic API may be enhanced with technical details about the corresponding relations. As an example, a specific section of the documentation can be tagged with "APPLIES_FOR_ACTION_A". These technical tags are then used, to toggle the visibility of the sections. In this example, the API documentation adjuster 125 can create a specific documentation for the simplified API. As an example, the description 414 and the description 418 of the API documentation 410 linked to the removed services from the API. By removing the description 414 and the description 418 from the API documentation 410, a simplified API documentation 410*b* is generated as shown in the example of FIG. 4B.

FIG. 5 illustrates a method 500 of simplifying an application programming interface in accordance with an example embodiment. For example, the method 500 may be executed by a host platform such as a server, a cloud platform, a user device, a software program, a combination thereof, and the like. Referring to FIG. 5, in 510, the method may include receiving source code of an application programming interface (API) of a custom software system with built-in functionality for accessing the API. For example, the receiving may include receiving an identifier of a file, an application, a service, etc., and retrieving a source code file or files based on the identifier.

In 520, the method may include identifying a subset of program components within the API which are not active based on a custom configuration of the source code of the API. In 530, the method may include removing the subset of program components from the API to generate a simplified API for the custom software system. In 540, the method may include transferring the simplified API to a storage.

In some embodiments, the removing may include removing one or more methods from an object-oriented software class within the source code of the API to generate the simplified API. IN some embodiments, the removing may further include keeping one or more different methods that already exist in the object-oriented software class within the source code of the API to generate the simplified API. In some embodiments, the identifying may include identifying one or more types of data objects which are not used by the custom software system based on the custom configuration of the source code of the custom software system, and the removing comprises removing one or more parts of functionality from the API for accessing the one or more types of data objects to generate the simplified API.

In some embodiments, the identifying may include identifying a program component within the API that can be removed based on a conditional statement within the source code of the custom software system, and the removing comprises removing logic of the program component from the source code of the API to generate the simplified API. In some embodiments, the source code of the API may include code associated with a plurality of API calls, and the removing may include generating a wrapper around a subset of API calls included in the plurality of API calls to generate the simplified API.

In some embodiments, the method may further include displaying a user interface that comprises an identifier of a possible program component included in the API that can be removed, and receiving feedback about the possible program component via the user interface. In some embodiments, the removing may include removing a part of functionality from the API based on the received feedback received via the user interface to generate the simplified API.

Figure 6:
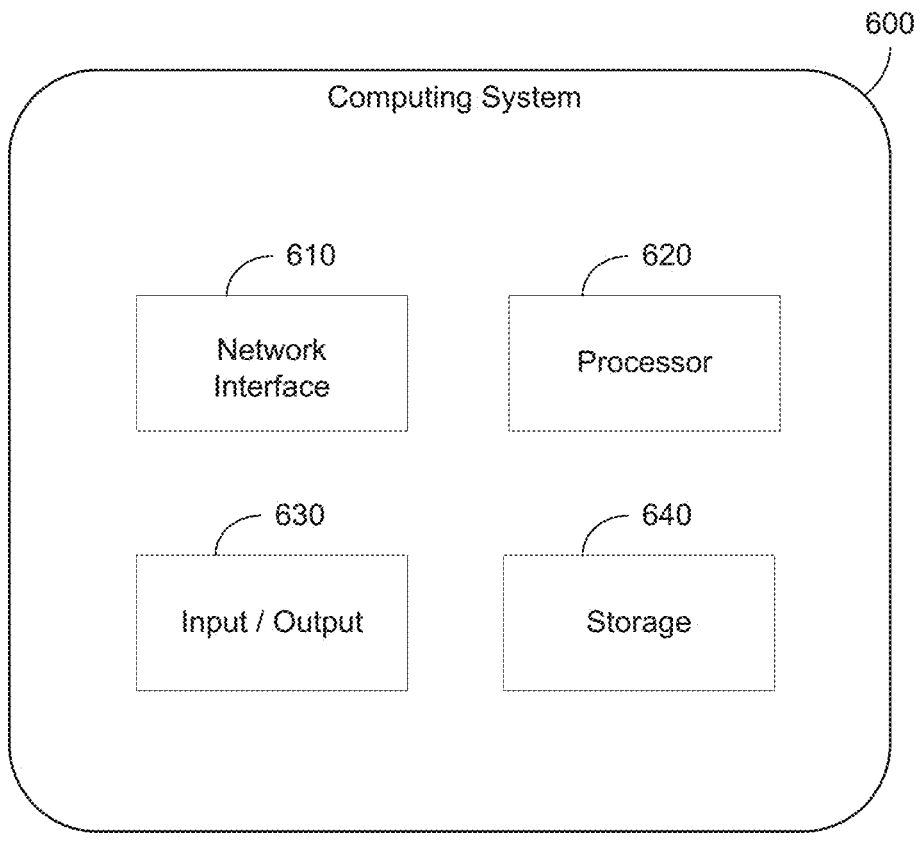
FIG. 6 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the methods described herein. According to various embodiments, the storage 640 may include a data store having a plurality of tables, records, partitions and sub-partitions. The storage 640 may be used to store database records, documents, entries, and the like. As another example, the storage 640 may include a code repository that is configured to store source code files of computer programs including APIs.

According to various embodiments, the processor 620 may receive source code of a custom software system with built-in functionality for accessing an application programming interface (API). The processor 620 may identify a subset of program components within the API which are not active based on a custom configuration of the source code of the custom software system. The processor 620 may remove the subset of program components from the API to generate a simplified API for the custom software system, and transfer the simplified API to the storage.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), cloud storage, and the like.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage; and
a processor configured to:
   receive source code of an application programming interface (API) of a custom software system with built-in functionality for accessing the custom software system,
   identify conditional logic within the source code of the API,
   check the activation status of program components within the API,
   identify a subset of the program components within the API which are not active based on an application of a configuration of the custom software system to the conditional logic and on the checked activation status of the program components,
   automatically remove the subset of program components from the API to generate a simplified API for the custom software system based on the identification of the subset of program components within the API which are not active, and
   transfer the simplified API to the storage.

2. The computing system of claim 1, wherein the processor is configured to remove one or more methods from an object-oriented software class within the source code of the API to generate the simplified API.

3. The computing system of claim 2, wherein the processor is further configured to keep one or more different methods that already exist in the object-oriented software class within the source code of the API to generate the simplified API.

4. The computing system of claim 1, wherein the processor is configured to identify one or more types of data objects which are not used by the custom software system based on a configuration of the source code of the API, and remove one or more parts from the API for accessing the one or more types of data objects to generate the simplified API.

5. The computing system of claim 1, wherein the processor is configured to identify a program component within the API that can be removed based on a conditional statement of the conditional logic within the source code of the API, and delete logic of the program component from the source code of the API to generate the simplified API.

6. The computing system of claim 1, wherein the source code of the API comprises a plurality of API calls, and the processor is configured to generate a wrapper around a subset of API calls included in the plurality of API calls to generate the simplified API.

7. The computing system of claim 1, wherein the processor is further configured to display a user interface that comprises an identifier of a possible program component included in the API that can be removed, and receive feedback about the possible program component via the user interface.

8. The computing system of claim 7, wherein the processor is configured to remove a feature from the API based on the feedback received via the user interface to generate the simplified API.

9. A method comprising:
   receiving source code of an application programming interface (API) of a custom software system with built-in functionality for accessing the custom software system;
   identifying conditional logic within the source code of the API;
   checking the activation status of program components within the API;
   identifying a subset of the program components within the API which are not active based on an application of a configuration of the custom software system to the conditional logic and on the checked activation status of the program components;
   automatically removing the subset of program components from the API to generate a simplified API for the custom software system based on the identification of the subset of program components within the API which are not active; and
   transferring the simplified API to a storage.

10. The method of claim 9, wherein the removing comprises removing one or more methods from an object-oriented software class within the source code of the API to generate the simplified API.

11. The method of claim 10, wherein the removing further comprises keeping one or more different methods that already exist in the object-oriented software class within the source code of the API to generate the simplified API.

12. The method of claim 9, wherein the identifying comprises identifying one or more types of data objects which are not used by the custom software system based on a configuration of the source code of the API, and the removing comprises removing one or more features from the API for accessing the one or more types of data objects to generate the simplified API.

13. The method of claim 9, wherein the identifying comprises identifying a program component within the API that can be removed based on a conditional statement of the conditional logic within the source code of the API, and the removing comprises logic of the program component from the source code of the API to generate the simplified API.

14. The method of claim 9, wherein the source code of the API comprises a plurality of API calls, and the removing comprises generating a wrapper around a subset of API calls included in the plurality of API calls to generate the simplified API.

15. The method of claim 9, wherein the method further comprises displaying a user interface that comprises an identifier of a possible program component included in the API that can be removed, and receiving feedback about the possible program component via the user interface.

16. The method of claim 15, wherein the removing comprises removing a part from the API based on the received feedback received via the user interface to generate the simplified API.

17. A computer-readable storage medium comprising instructions which when executed by a processor cause a computer to perform:

receiving source code of an application programming interface (API) of a custom software system with built-in functionality for accessing the custom software system;

identifying conditional logic within the source code of the API;

checking the activation status of program components within the API;

identifying a subset of the program components within the API which are not active based on an application of a configuration of the custom software system to the conditional logic and on the checked activation status of the program components;

automatically removing the subset of program components from the API to generate a simplified API for the custom software system based on the identification of the subset of program components within the API which are not active; and transferring the simplified API to a storage.

18. The computer-readable storage medium of claim 17, wherein the removing comprises removing one or more methods from an object-oriented software class within the source code of the API to generate the simplified API.

19. The computer-readable storage medium of claim 18, wherein the removing further comprises keeping one or more different methods that already exist in the object-oriented software class within the source code of the API to generate the simplified API.

20. The computer-readable storage medium of claim 17, wherein the identifying comprises identifying one or more types of data objects which are not used by the custom software system based on a configuration of the source code of the API, and the removing comprises removing one or more parts from the API for accessing the one or more types of data objects to generate the simplified API.

\* \* \* \* \*